United States Patent
Raj et al.

(10) Patent No.: US 8,812,830 B2
(45) Date of Patent: Aug. 19, 2014

(54) ATTESTATION PROTOCOL FOR SECURELY BOOTING A GUEST OPERATING SYSTEM

(75) Inventors: Himanshu Raj, Issaquah, WA (US); Stefan Saroiu, Redmond, WA (US); Alastair Wolman, Seattle, WA (US); Paul England, Bellevue, WA (US); Anh M. Nguyen, Urbana, IL (US); Shravan Rayanchu, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 13/222,379

(22) Filed: Aug. 31, 2011

(65) Prior Publication Data

US 2013/0054948 A1 Feb. 28, 2013

(51) Int. Cl.
*G06F 9/00* (2006.01)
*G06F 15/177* (2006.01)
*G06F 9/455* (2006.01)
*G06F 7/04* (2006.01)

(52) U.S. Cl.
USPC ........... 713/2; 709/222; 718/1; 726/3; 726/26

(58) Field of Classification Search
CPC ............................... G06F 9/455; G06F 21/575
USPC .................. 713/2; 709/222; 718/1; 726/3, 26
See application file for complete search history.

(56) References Cited

U.S. PATENT DOCUMENTS

| | | | |
|---|---|---|---|
| 7,409,719 | B2 | 8/2008 | Armstrong et al. |
| 7,506,380 | B2 | 3/2009 | Hunter et al. |
| 7,725,703 | B2 | 5/2010 | Hunter et al. |
| 8,028,172 | B2 | 9/2011 | Hunter et al. |
| 8,255,484 | B2 * | 8/2012 | Khandekar et al. ........... 709/217 |

(Continued)

FOREIGN PATENT DOCUMENTS

| | | |
|---|---|---|
| EP | 1953666 A2 | 8/2008 |
| EP | 1975836 A2 | 10/2008 |
| EP | 2196936 A1 | 6/2010 |

OTHER PUBLICATIONS

Foley, "Microsoft Mulls Improving Hypervisor Security for the Cloud with Bunker-V", Jun. 2010, retrieved Dec. 1, 2011 at http://www.zdnet.com/blog/microsoft/microsoft-mulls-improving-hypervisor-security-for-the-cloud-with-bunker-v/6545, 3 pgs.
VMWare, "ESX Server 2 Security White Paper", Sep. 2004, retrieved Dec. 1, 2011 at http://www.vmware.com/pdf/esx2_security.pdf, 10 pgs.

(Continued)

*Primary Examiner* — Stefan Stoynov
(74) *Attorney, Agent, or Firm* — Dan Choi; Carole Boelitz; Micky Minhas (57) ABSTRACT

In a cloud computing environment, a production server virtualization stack is minimized to present fewer security vulnerabilities to malicious software running within a guest virtual machine. The minimal virtualization stack includes support for those virtual devices necessary for the operation of a guest operating system, with the code base of those virtual devices further reduced. Further, a dedicated, isolated boot server provides functionality to securely boot a guest operating system. The boot server is isolated through use of an attestation protocol, by which the boot server presents a secret to a network switch to attest that the boot server is operating in a clean mode. The attestation protocol may further employ a secure co-processor to seal the secret, so that it is only accessible when the boot server is operating in the clean mode.

20 Claims, 6 Drawing Sheets

(56) References Cited

U.S. PATENT DOCUMENTS

| | | | |
|---|---|---|---|
| 8,549,272 B2 * | 10/2013 | Mullin et al. | 713/1 |
| 8,601,583 B1 * | 12/2013 | Chandrasekhar et al. | 726/24 |
| 2006/0136653 A1 | 6/2006 | Traut et al. | |
| 2006/0236127 A1 | 10/2006 | Kurien et al. | |
| 2007/0050764 A1 | 3/2007 | Traut | |
| 2007/0067617 A1 | 3/2007 | Tarkkala | |
| 2008/0163232 A1 | 7/2008 | Walrath | |
| 2009/0172662 A1 | 7/2009 | Liu | |
| 2009/0259854 A1 | 10/2009 | Cox et al. | |
| 2010/0037296 A1 | 2/2010 | Silverstone | |
| 2010/0306774 A1 * | 12/2010 | Kalbarga | 718/1 |
| 2010/0318781 A1 | 12/2010 | Nicolson et al. | |
| 2010/0325628 A1 | 12/2010 | Haga et al. | |
| 2011/0066838 A1 | 3/2011 | Takayama et al. | |
| 2011/0072266 A1 | 3/2011 | Takayama et al. | |
| 2011/0173643 A1 | 7/2011 | Nicolson et al. | |
| 2011/0185165 A1 | 7/2011 | Haga et al. | |
| 2011/0246778 A1 * | 10/2011 | Duane | 713/176 |

OTHER PUBLICATIONS

Berger et al, "TVDc: Managing Security in the Trusted Virtual DataCenter", Newsletter, ACM SIGOPS Operating Systems Review, vol. 42, Issue 1, Jan. 2008, 8 pgs.

Nguyen et al, "Improving the Security of Commodity Hypervisors for Cloud Computing", Presentation Jun. 2010 Annual Microsoft Research Networking Summit, 22 pgs.

Porquet et al, "Multi-Compartment: A New Architecture for Secure Co-Hosting on SoC", Intl Symposium on System-on-Chip, Oct. 2009, 4 pgs.

Srivastava et al, "Kernel Data Integrity Protection via Memory Access Control", SCS Technical Report GT-CS-09-04, Publisher: Georgia Institute of Technology, 1990, 20 pgs.

Xu et al, "Towards a VMM Based Usage Control Framework for OS Kernel Integrity Protection", SACMAT 07, Jun. 2007, 10 pgs.

Yang et al, "Using Hypervisor to Provide Data Secrecy for User Applications on a Per Page Basis", Proc 4th ACM SIGPLSAN—SIGOPS Intl Conf on Virtual Execution Environments, Mar. 2008, 10 pgs.

\* cited by examiner

ATTESTATION PROTOCOL FOR SECURELY BOOTING A GUEST OPERATING SYSTEM

BACKGROUND

With the increase in availability of high-speed, high-bandwidth network capacity, cloud computing has become a more common solution for providing computing resources to users. Using cloud computing techniques, a data center may provide various services (e.g., applications, data access, data storage, and the like) to a remote end-user, without requiring that the end-user have knowledge of the hardware and/or software infrastructure that provides the services.

Cloud computing services may provide a remote end-user with access to a host server within a data center, and the host server may include one or more virtual machines (VMs) on which customers may install and execute third party software, such as an operating system (OS) and/or various applications. Each VM has access to a virtualization stack—software that provides support for one or more virtual devices of the host server. However, traditional virtualization stacks tend to be large and may have security vulnerabilities. Thus, traditional virtualization techniques used in cloud computing could allow malicious third-party software to compromise an entire physical server in the cloud, or even other servers in the cloud.

SUMMARY

More secure cloud computing services are provided through use of a reduced virtualization stack running on one or more production servers of a data center. The production server provides cloud computing services to users. The production server virtualization stack is minimized to present fewer security vulnerabilities to malicious software running within a guest VM on the production server. This minimal virtualization stack includes support for those virtual devices necessary for operation of a guest OS and or applications, including virtual devices associated with network, storage, and processing functionality. In some embodiments, the code base for these virtual devices is further reduced by removing code that is unnecessary in the cloud computing environment, such as code related to initialization and power management of physical devices.

The production server's minimal virtualization stack does not include virtual devices that are not needed in the cloud computing environment. Further, the minimal virtualization stack running on a production server also may not include certain virtual devices that are necessary to boot a guest OS. Unfortunately, certain OSs (e.g., commodity OSs) do not boot in the absence of some of these virtual devices even though they are not needed for the operation of a guest OS post-boot. Given this, a dedicated boot server, with a more complete virtualization stack, provides functionality to boot a guest OS. The boot server receives from a production server an image of a guest VM that includes a guest OS to be booted. The boot server is then disconnected from the network while the guest VM is initialized and the guest OS boots. After successful boot of the guest OS, an image is taken to preserve the state of the guest VM and booted guest OS. The boot server is then rebooted into a clean mode, and restored to a clean environment, after which the image of the guest VM is sent to the production server where the guest OS can resume operation.

Isolation of the boot server from the network while the guest OS is booting ensures that any malicious software that corrupts the boot server is unable to attack other devices. The boot server is isolated through use of an attestation protocol, through which the boot server attests that it is in a clean mode when no guest VMs are executing on it. In some embodiments, the attestation mode uses the media access control (MAC) address of the boot server's network interface controller (NIC) as a secret, and isolation is ensured by a network switch that has the MAC address in its whitelist.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
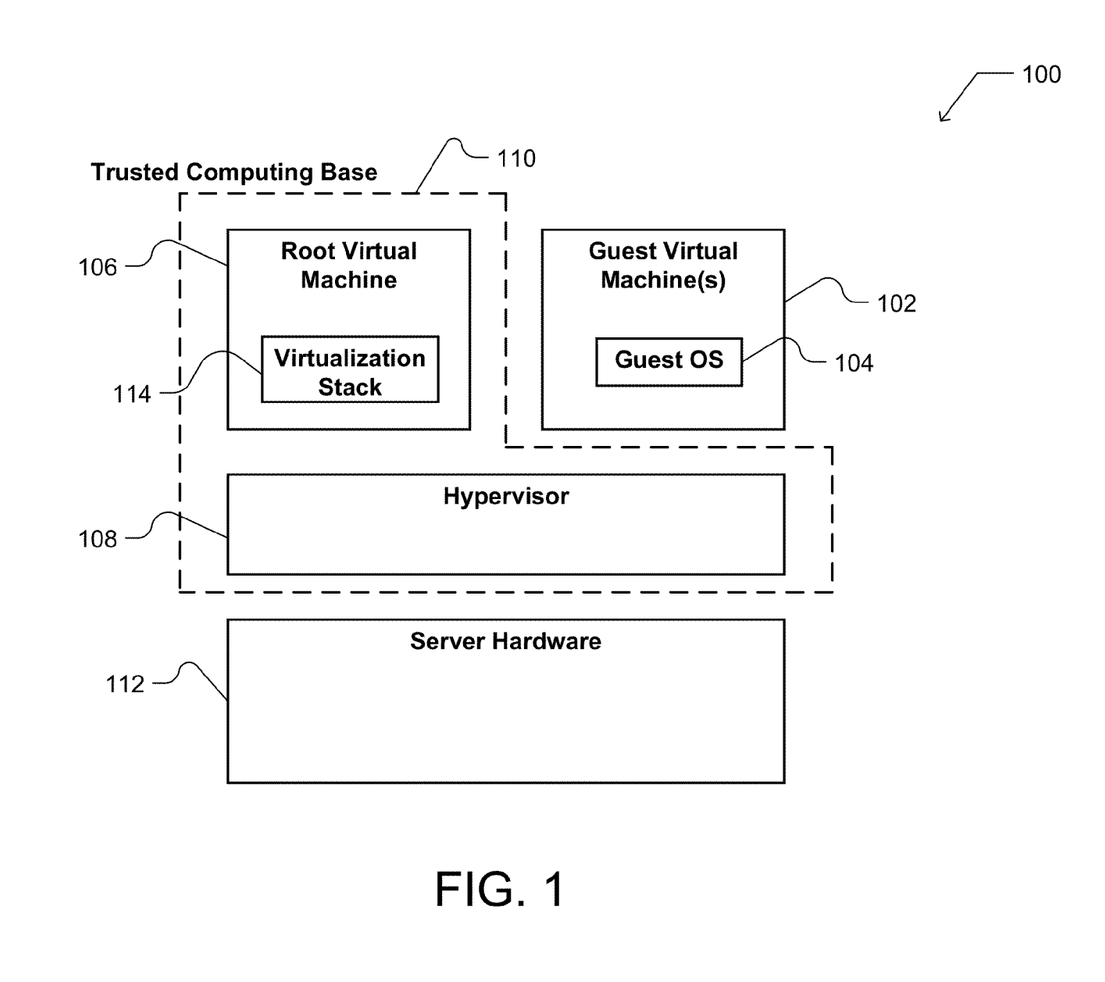
FIG. 1 is a schematic diagram depicting an example virtualization configuration for providing cloud computing services.

Cloud computing services provide a remote user with access to an OS executing on a host server within a data center. Generally, data centers rely on virtualization technology to multiplex hardware resources for simultaneous use by multiple customers, and one or more virtualization configurations may be used to provide resources to a user. An example virtualization configuration is depicted in FIG. 1, which shows a virtualization configuration 100 for a server device providing cloud services to a user. Such a server may support one or more VMs. As used herein, a VM is a computer environment in which software can run. In general, a server may support two types of VM: a root VM and one or more guest VMs.

As shown in FIG. 1, one or more guest VMs 102 may each provide a computer environment within which guest software can run. This guest software may include one or more guest OSs 104, and/or various applications. In some cases, a data center (e.g. cloud computing services provider) may provide a guest VM as a "sandbox" to each of its customers, and the customer may install and execute one or more guest OSs and/or applications within its designated guest VM. In a secure cloud computing environment, each guest VM is isolated and/or compartmentalized, and cannot gain access to other guest VMs assigned to other customers.

The second type of VM is the root VM, e.g. root VM 106 of FIG. 1. The root VM is a privileged VM that an administrator can use to manage the other, guest VMs on a server. The root VM is also sometimes referred to as the host VM, privileged VM, administrator VM, or dom0 (the latter in the context of Xen® virtualization software). In general, one instance of the root VM is present on a server, to manage one or more guest VMs on the server.

Virtualization configuration 100 may also include a hypervisor 108. A hypervisor (also sometimes known as a virtual machine manager) is installed on the server device to control and monitor execution of all the VMs, including the root VM and guest VMs. In some configurations, the hypervisor may also act as host software that creates the various VMs as computer environments in which guest software can execute. Taken together, the hypervisor 108 and root VM 106 form a Trusted Computing Base (TCB) 110 of the server device. The TCB 110 is the set of software that characterizes the security properties of the server device. In other words, a cloud service provider can legitimately state that the server device is secure if the TCB of the server device is not compromised (e.g., free of malicious software that may seek to exploit security vulnerabilities on the server device).

The hypervisor 108, root VM 106, and guest VM(s) 102 execute on top of the server hardware 112. Moreover, as shown in FIG. 1, root VM 106 includes a virtualization stack 114. The virtualization stack provides the third-party guest software (e.g. guest OS and/or applications) running within guest VM(s) with access to the devices supported by the server hardware, and acts as an interface between the guest software and the TCB. Although the virtualization stack 114 is part of the root VM 106, the root VM may provide each executing guest VM with its own executing instance of the virtualization stack to access virtual devices. In some embodiments, each guest VM may use an instance of the same virtualization stack. However, in other embodiments, different guest VMs may employ different virtualization stacks that are customized for the particular needs of different users. Because the virtualization stack acts as an interface between the TCB 110 and guest software, such as guest OS(s) 104 running on guest VM(s) 102, the TCB may be more effectively defended from malicious software by minimizing the virtualization stack.

A security vulnerability present in the virtualization stack 114 could allow a guest VM to compromise some or all of the software running on the server device, such as the root VM 106 and guest VM(s) 102. Because a primary role of the hypervisor is to isolate each guest VM from the others, a vulnerability that allows software running within one guest VM to gain access to other guest VMs could be particularly dangerous, and could compromise the security of the TCB 110. Further, in other cases malicious software running within one guest VM could launch denial-of-service (DoS) attacks or other types of remote attacks against other VMs on a server, and thus compromise the performance of the other VMs even without gaining direct access to them.

Embodiments described herein provide for a reduced virtualization stack, to limit the amount of code included in the TCB and thus reduce the number of security vulnerabilities that may be exploited by malicious third-party software running within a guest VM. In some embodiments, the virtual devices supported by the virtualization stack are classified into one of three categories: extraneous devices, legacy devices, and required devices.

The first category includes those virtual devices that are extraneous (i.e., not needed by a guest OS executing within a guest VM in the cloud). The second category includes those legacy virtual devices that are not needed by a guest OS during its post-boot operation, but without which the guest OS cannot boot. The third category includes those required virtual devices that are needed to run a guest OS in the cloud. Generally, a user running a guest OS needs storage and networking capability. Thus, the third category includes virtual devices required to offer storage and networking capabilities to the guest OS. These three categories are described in more detail herein with reference to FIG. 4.

In some embodiments, one or more production servers are provided to host guest VMs on which users can install third-party software, and each production server includes a reduced virtualization stack that reduces the number of potential security vulnerabilities that may be exploited by malicious third-party software. In some embodiments, the reduced virtualization stack on a production server may include the third category of required virtual devices, but not the first and second categories as described above. Moreover, in some embodiments, the virtual devices of this third category may themselves have reduced functionality. In this way, a minimal virtualization stack may be provided that substantially minimizes security vulnerabilities.

Certain OSs (e.g. commodity OSs such as Windows®, Linux®, and others) may not boot unless they detect the presence of certain devices, such as the second category of legacy virtual devices described above. Given this, embodiments include a dedicated, isolated boot server on which a guest OS may boot. Such a dedicated boot server includes a more complete virtualization stack, such as a stack with all three categories or, in some embodiments, the second and third categories described above.

Because the boot server includes a more complete virtualization stack, it may be more vulnerable to security exploits than a production server with a reduced virtualization stack. Given this, and because the guest OS to be booted may include malicious software, embodiments include a process to ensure that the boot server remains isolated from the network while it is booting a guest OS. The term "dirty mode" is used herein to refer to the operational mode of the boot server when it has a guest VM and/or guest OS loaded onto it, to boot the guest OS. It should be noted that the term dirty mode does not indicate that the boot server is known to be infected with malicious software, but rather that the boot server is in a state where there is a possibility that it has been compromised because it is running guest software. The term "clean mode" is used herein to refer to the operational mode of the boot server when there is no guest VM, guest OS, or guest software loaded onto it. In some embodiments, when the boot server is operating in a clean mode it has been loaded with an image from a known-good state of the boot server.

The process of booting a guest OS on the isolated boot server is described in more detail below. Briefly described, the process begins when the boot server receives a first image of a guest VM and guest OS to be booted. The boot server receives the first image from one of the production servers. After receiving the image, the boot server is rebooted into a dirty mode, and disconnected from the network. While the boot server is in dirty mode, the guest OS is booted, and a second image of the guest VM and booted guest OS is saved. Then, the boot server is rebooted into a clean mode, and a clean image of the boot server (i.e., a known good image that is known to be free of malicious software) is written to the boot server, overwriting any potentially malicious software carried within the just-booted guest OS.

After the boot server is rebooted into clean mode, its network connection is restored, and the second image of the guest VM and booted guest OS is sent to the production server, to allow the guest OS to execute on the production server. To ensure that the boot server is isolated from the network (and from other computers) while booting the guest OS, embodiments employ an attestation protocol to attest that the boot server is operating in a particular software configuration, i.e. the clean mode. The attestation protocol provides for a secret, and binds the secret so that it is only accessible while the boot server is operating in clean mode. In some embodiments, this secret comprises the MAC address of a NIC of the boot server, and this MAC address is whitelisted by a network switch so that network connectivity is provided only when the boot server NIC presents the whitelisted MAC address to the switch.

Illustrative Environment

Figure 2:
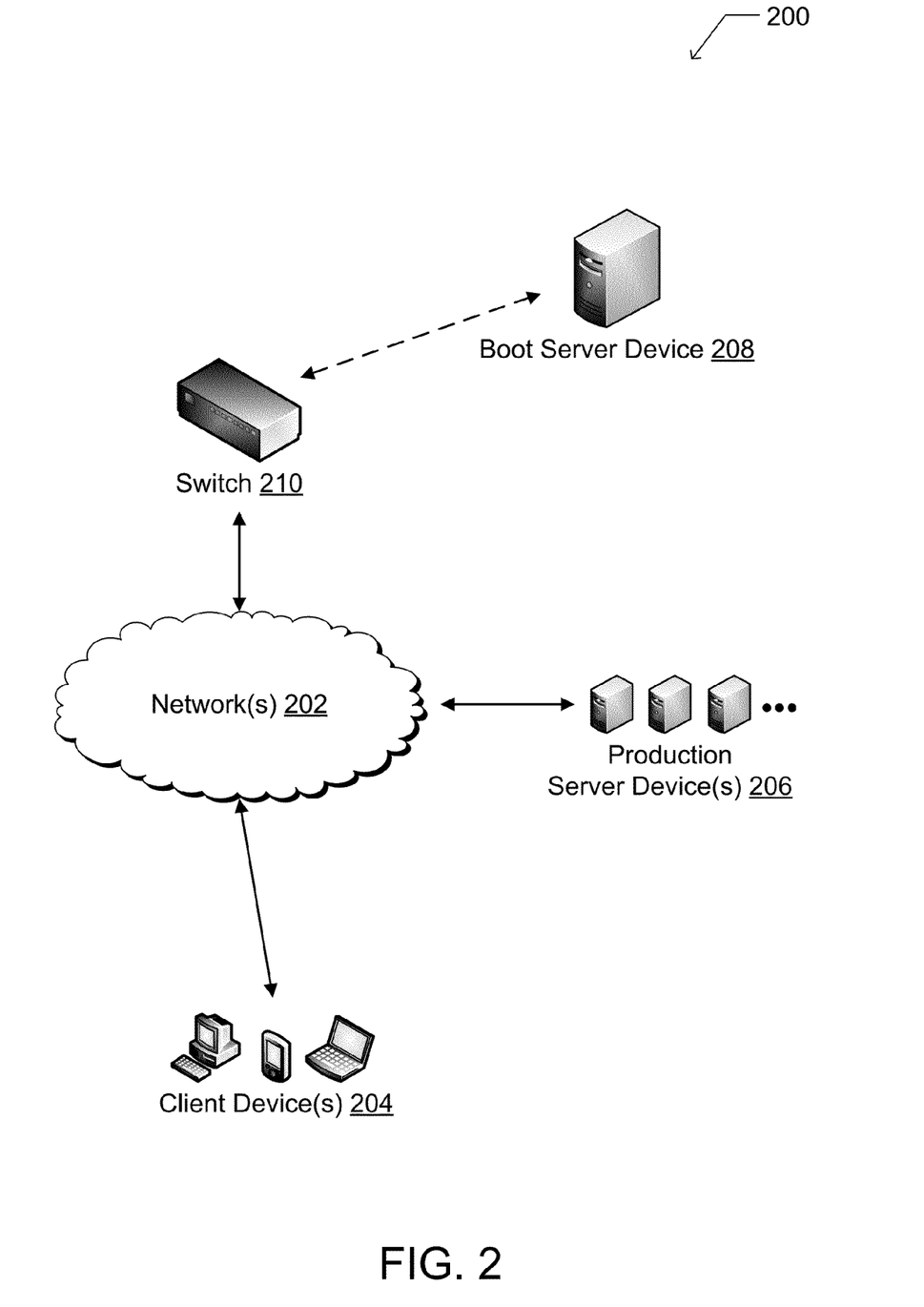
FIG. 2 is a schematic diagram depicting an example environment in which embodiments may operate.

FIG. 2 depicts an example environment 200 in which embodiments operate. As shown, the various devices of environment 200 communicate with one another via one or more networks 202 that may include any type of networks that enable such communication. For example, networks 202 may include public networks such as the Internet, private networks such as an institutional and/or personal intranet, or some combination of private and public networks. Networks 202 may also include any type of wired and/or wireless network, including but not limited to local area networks (LANs), wide area networks (WANs), Wi-Fi, WiMax, and mobile communications networks (e.g. 3G, 4G, and so forth). Networks 202 may utilize communications protocols, including packet-based and/or datagram-based protocols such as internet protocol (IP), transmission control protocol (TCP), user datagram protocol (UDP), or other types of protocols. Moreover, networks 202 may also include a number of devices that facilitate network communications and/or form a hardware basis for the networks, such as switches, routers, gateways, access points, firewalls, base stations, repeaters, backbone devices, and the like.

Environment 200 further includes one or more client device(s) 204 associated with user(s). Briefly described, client device(s) 204 may include any type of computing device that a user may employ to send and receive information over networks 202. For example, client device(s) 204 may include, but are not limited to, desktop computers, laptop computers, pad computers, wearable computers, media players, automotive computers, mobile computing devices, smart phones, personal data assistants (PDAs), game consoles, mobile gaming devices, set-top boxes, and the like. Client device(s) 204 generally include one or more applications that enable a user to send and receive information over the web and/or internet, including but not limited to web browsers, e-mail client applications, chat or instant messaging (IM) clients, and other applications.

As shown in FIG. 2, environment 200 may also include one or more production server device(s) 206. Production server device(s) 206 and boot server device 208 are described in greater detail herein with regard to FIG. 3. Briefly stated, production server device(s) 206 include computing devices that are configured to provide cloud computing services to users (e.g., customers of a data center). Provision of cloud computing services may include providing one or more guest VMs on which user can install third-party software such as guest OSs and/or applications. In some embodiments, such guest VMs are managed by a root VM that includes a reduced virtualization stack, as described herein. In some embodiments, a user using one of the client device(s) 204 may log into a production server device, and take advantage of cloud computing services offered thereon.

Environment 200 also includes boot server device 208. Although FIG. 2 depicts a single boot server, in some embodiments more than one boot server may be employed to provide boot services more efficiently to the production server device(s) 206. Boot server device 208 includes a more complete virtualization stack than those present on production server device(s) 206. Boot server device 208 can be isolated from the rest of environment 200, to enable secure booting of a guest OS received from one of the production server device(s) 206. Such isolation may be facilitated through the use of a switch, such as the depicted switch 210, which provides a single point of connection between boot server device 208 and the rest of environment 200, and the outside world generally. Embodiments include an attestation protocol that interacts with switch 210, and that attests that the boot server is operating in clean mode to ensure that the boot server device 208 may communicate with other devices only when it is operating in clean mode. This attestation protocol is described further herein.

Although not explicitly depicted, environment 200 may further include one or more databases or other storage devices, configured to store data related to the various operations described herein. Such storage devices may be incorporated into one or more of the devices depicted, or may be external storage devices separate from but in communication with one or more of the devices. For example, stored data may be related to operations of production server device(s) 206 in providing guest VMs on which users can install guest OSs and/or applications, and to the boot status of guest OSs on production server device(s) 206. Stored data may also include information regarding the operations of boot server 208, including but not limited to history of guest OSs that have booted on the boot server device 208, the users (e.g., customers) that the guest OSs are associated with, and/or the particular production server on which various users installed their guest OSs or other software.

In general, each of the one or more of the devices depicted in FIG. 2 may include multiple computing devices arranged in a cluster, server farm, or other grouping to share workload. Such groups of devices may be load balanced or otherwise managed to provide more efficient operations. Moreover, although various computing devices of environment 200 are described as clients or servers, each device may operate in either capacity to perform operations related to various embodiments. Thus, the description of a device as client or server is provided for illustrative purposes, and does not limit the scope of activities that may be performed by any particular device.

Illustrative Computing Device Architecture

Figure 3:
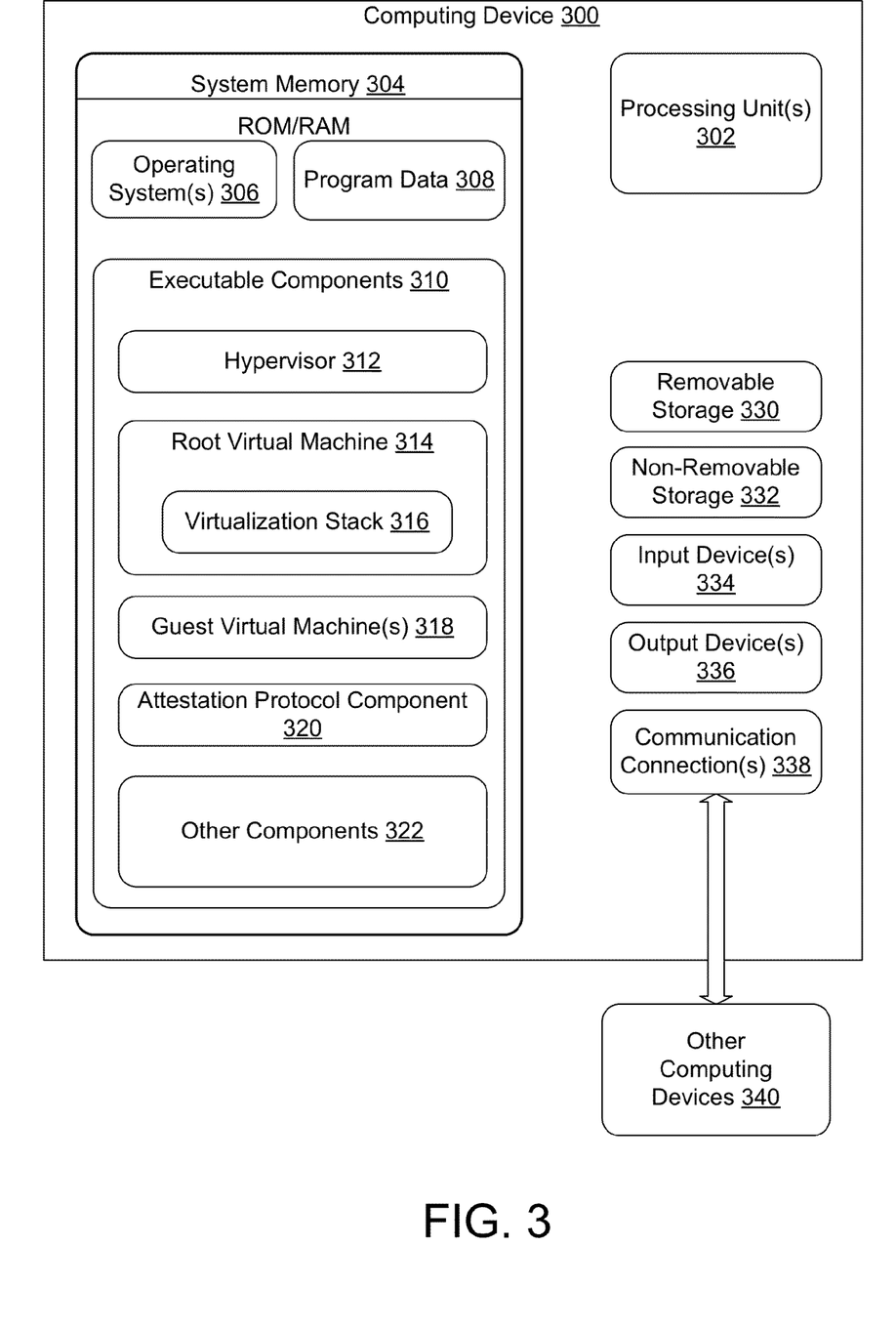
FIG. 3 is a diagram of an example computing device that may be deployed as part of the example environment of FIG. 2.

FIG. 3 depicts a block diagram of an example computer system architecture for the various devices depicted in FIG. 2. As shown, computing device 300 includes processing unit 302. Processing unit 302 may include one or more processing units (e.g., processors), and may be implemented as hardware, software, or some combination thereof. As used herein, processor refers to a hardware component. Processing unit 302 may include computer-executable, processor-executable, and/or machine-executable instructions written in any suitable programming language to perform various functions described herein. In some embodiments, processing unit 302 may further include one or more graphics processing units (GPUs).

Computing device 300 further includes a system memory 304, which may include volatile memory such as random access memory (RAM), static random access memory (SRAM), dynamic random access memory (DRAM), and the like. System memory 304 may also include non-volatile memory such as read only memory (ROM), flash memory, and the like. System memory 304 may also include cache memory. As shown, system memory 304 includes one or more OS(s) 306, and program data 308 that is generated and/or employed by one or more executable components 310 and/or OS(s) 306 during their execution. Executable components 310 include programs, applications, and/or processes that are loadable and executable by processing unit(s) 302.

Where computing device 300 represents production server device(s) 206 or boot server device 208, executable components 310 include a hypervisor 312. As described herein, hypervisor 312 manages and creates root VM 314 and guest VM(s) 318, and presents guest VM(s) 318 as virtual operating platforms on which users may install guest software such as a guest OS (not shown). Executable components 310 may also include a virtualization stack 316 that runs within root VM 314. In some embodiments, the virtualization stack 316 may be reduced (e.g., may support fewer virtual devices) on a production server and may be more complete on the boot server.

Executable components 310 may also include an attestation protocol component 320 to control the operation of the attestation protocol on the boot server. As discussed further herein, the attestation protocol operates to ensure that the boot server is isolated from the rest of the network and from other devices while a guest OS is booting on the boot server. Executable components 310 may also include other components 322.

As shown in FIG. 3, computing device 300 may also include removable storage 330 and/or non-removable storage 332, including but not limited to magnetic disk storage, optical disk storage, tape storage, and the like. Disk drives and associated computer-readable media may provide non-volatile storage of computer readable instructions, data structures, program modules, and other data for operation of computing device 300.

In general, computer-readable media includes computer storage media and communications media.

Computer storage media includes volatile and non-volatile, removable and non-removable media implemented in any method or technology for storage of information such as computer readable instructions, data structure, program modules, and other data. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave or other transmission mechanism. As defined herein, computer storage media does not include communication media.

Computing device 300 may include input device(s) 334, including but not limited to a keyboard, a mouse, a pen, a voice input device, a touch input device, and the like. Computing device 300 may further include output device(s) 336 including but not limited to a display, a printer, audio speakers, and the like. Computing device 300 may further include communications connection(s) 338 that allow computing device 300 to communicate with other computing devices 340, including client devices, server devices, databases, or other computing devices accessible over network(s) 202.

Illustrative Virtualization Stack Configurations

Generally, a guest VM running on a production server does not have direct I/O access to hardware of the production server. Instead, I/O access is mediated by a virtualization stack. A virtualization stack provides virtual device access to software running within the one or more VMs managed by the hypervisor. In some embodiments, the virtualization stack is part of the root VM as shown in FIG. 1, with the root VM running an instance of the virtualization stack for each guest VM. In some embodiments, the root VM creates a new instance of the virtualization stack for each guest VM. This process may be transparent to the guest VM, so that the guest VM is not aware that it is accessing virtualized devices instead of actual hardware devices.

Embodiments support three approaches to implementing a virtual device: 1) multiplexing the virtual device over the corresponding real physical device provided by the OS running in the root VM; 2) emulating the hardware device entirely in software to provide the desired functionality; and 3) providing virtualization services through a device interface. Some or all of these methods may be used to implement various virtual devices supported by the virtualization stack.

Figure 4:
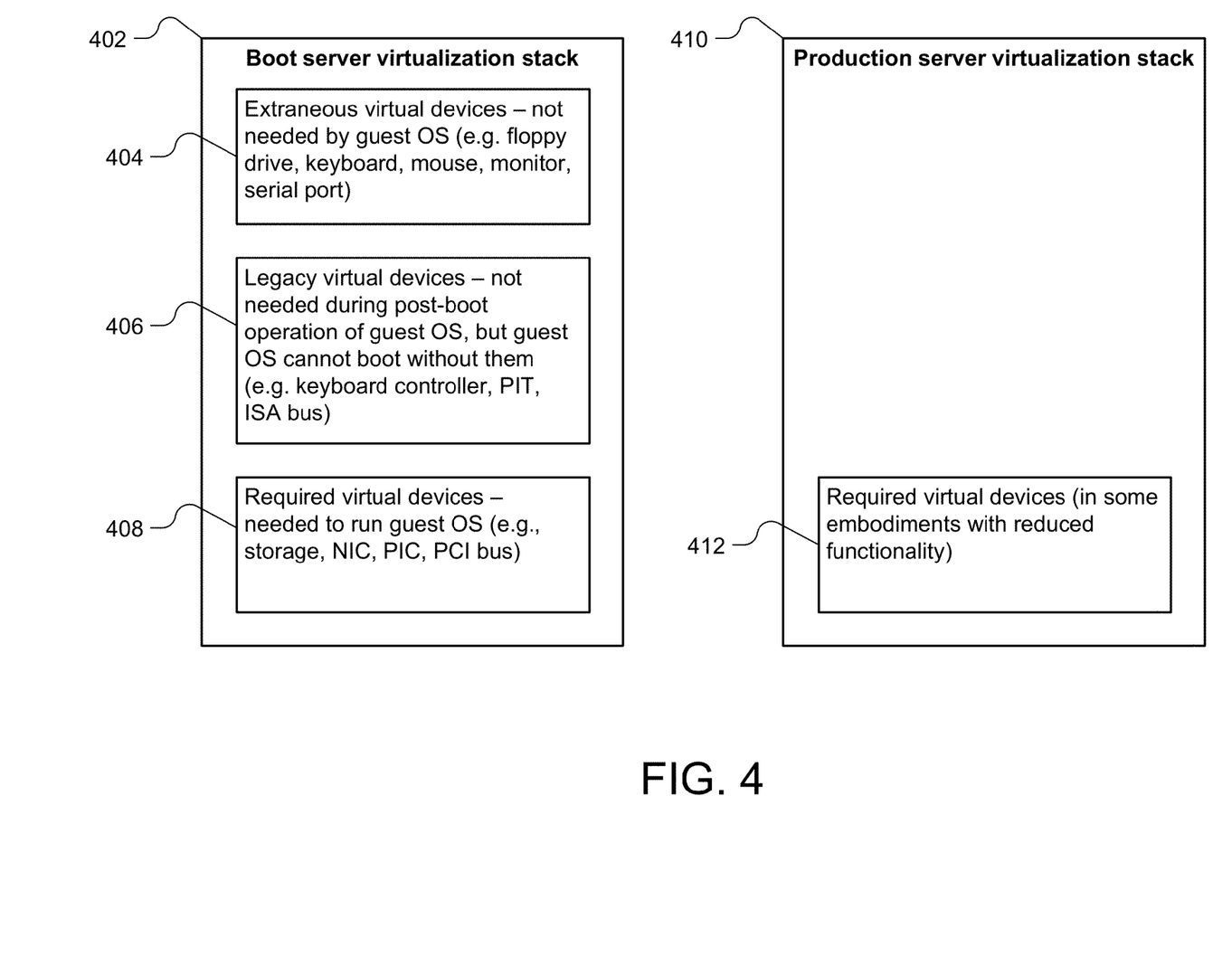
FIG. 4 is a schematic diagram depicting example virtualization stacks, according to embodiments.

As discussed herein, to increase the security of the TCB of a production server that provides cloud computing services to users, a production server may include a virtualization stack that is reduced in comparison to the virtualization stack running on a boot server. FIG. 4 provides a comparison of example virtualization stacks that may be included on the boot server and production servers, according to various embodiments. As shown, a boot server virtualization stack 402 may include support some or all of three categories of virtual devices: extraneous virtual devices, legacy virtual devices, and required virtual devices.

Extraneous virtual devices: The first category, shown in block 404, includes those virtual devices that are extraneous or unnecessary (i.e., not needed by a guest OS executing within a guest VM), including but not limited to a floppy drive, a keyboard, a mouse, a monitor, a serial port, a graphics card, devices associated with display functionality generally, and devices associated with power management.

Legacy virtual devices: The second category, shown in block 406, includes those legacy virtual devices that are not needed by a guest OS during its post-boot operation, but without which the guest OS cannot boot. There are two reasons a guest OS may need a particular device to be present at boot time. First, the production server's Basic Input/Output System (BIOS) and/or the guest OS itself may check for the presence of a legacy device at boot time. Second, the BIOS and/or guest OS may perform device initialization and/or power management functions for the legacy device. Legacy virtual devices may include, but are not limited to, a keyboard controller, an Industry Standard Architecture (ISA) bus controller, a video card, and a programmable interrupt timer (PIT). In some embodiments, the list of legacy virtual devices needed at boot time is determined experimentally by disabling each virtual device one at a time, and attempting to boot the guest OS. This determination may also rely on determining dependencies between virtual devices, as described in more detail below.

Required virtual devices: The third category, shown in block 408, includes those required virtual devices that are needed to run a guest OS. In some embodiments, the required virtual devices include those devices needed for processing, disk storage, and/or networking functionality. These may include, but are not limited to, a storage device, a NIC, an integrated drive electronics (IDE) controller, a clock, a virtual motherboard, a shared-memory interface (such as a VM bus), a programmable interrupt controller (PIC), and a peripheral component interconnect (PCI) bus controller. It should be noted that this list is not meant to be exhaustive. In some cases, a guest OS may have a particular use for one or more additional devices other than those listed, and/or a guest OS may have changing needs.

In some embodiments, the boot server virtualization stack 402 may include all three categories of virtual devices. In other embodiments, the boot server virtualization stack 402 may include legacy virtual devices 406 and required virtual devices 408, and may not include extraneous virtual devices 404. Such a configuration provides a somewhat reduced code base for the TCB of the boot server, to provide increased security.

As shown in FIG. 4., production server virtualization stack 410 supports fewer virtual devices than boot server virtualization stack 402. In some embodiments, production server virtualization stack 410 includes only the required virtual devices 412 (e.g., those virtual devices needed for the operation of a guest OS), and does not include extraneous or legacy virtual devices. In this way, the production server runs with a smaller code base for its TCB, thus minimizing potential security exploits by malicious third-party software.

In the reduced production server virtualization stack 410, extraneous and/or legacy virtual devices are disabled. In some embodiments, this disabling may include determining dependencies between virtual devices, because a virtual device may not be disabled unless all of its dependent virtual devices are also disabled. Determination of virtual device dependencies may take place through the use of one or more heuristics that test for the presence or absence of a dependency between two virtual devices. Embodiments support three heuristics: 1) object file reference analysis; 2) experimental device instantiation; and 3) source code inspection.

In the object file reference analysis heuristic, object files created at compile time are classified to determine which object files contain functionality for a single device. Then, the symbol tables for these object files are searched for external references to symbols defined in other object files (e.g., object files associated with other virtual devices). Existence of such an external reference provides evidence of a dependency between two devices. However, this heuristic may not identify all dependencies, given that certain invocations from one device to another may be performed as indirect calls using function pointers.

In the experimental device instantiation heuristic, a device is disabled from execution. For example, this disabling may be performed by commenting out the device in the device instantiation listing in the virtual motherboard's manifest. This commenting out may cause the guest VM to fail to instantiate properly and/or a guest OS to fail to boot when other, still present devices depend on the disabled device. If instantiation fails, then other devices may be similarly disabled (e.g., commented out), until instantiation succeeds. In cases where successful instantiation with a first device disabled depends on a second device also being disabled, the second device is determined to depend on the first device.

In the source code inspection heuristic, source code for virtual devices is manually inspected to look for dependencies. This manual process may be time-consuming and error-prone. Given that, in some embodiments source code inspection is used to supplement the shortcomings of the first two heuristics.

In some embodiments, the TCB of the production server is further reduced (and thus made even more secure), through a reduction of the functionality of the required virtual devices 412. This further reduction of functionality may include rewriting and/or modifying the code implementing one or more required virtual devices to remove functionality not needed in the cloud. For example, code related to initialization and/or power management for certain virtual devices may be removed to reduce the size of the code base of a virtual device.

Because the production servers operate with a reduced virtualization stack that does not include those legacy virtual devices needed to boot a guest OS, various implementations require a dedicated boot server with a more complete virtualization stack on which a guest OS may boot. Because the boot server runs with a more complete (and therefore potentially more vulnerable) TCB, embodiments support the isolation of the boot server while a guest OS is booting thereon. Thus, even when the guest OS includes malicious software, any potential corruption to the boot server is not given an opportunity to spread to other devices. This aspect is described further with reference to FIGS. 5 and 6.

Illustrative Operation

Figure 5:
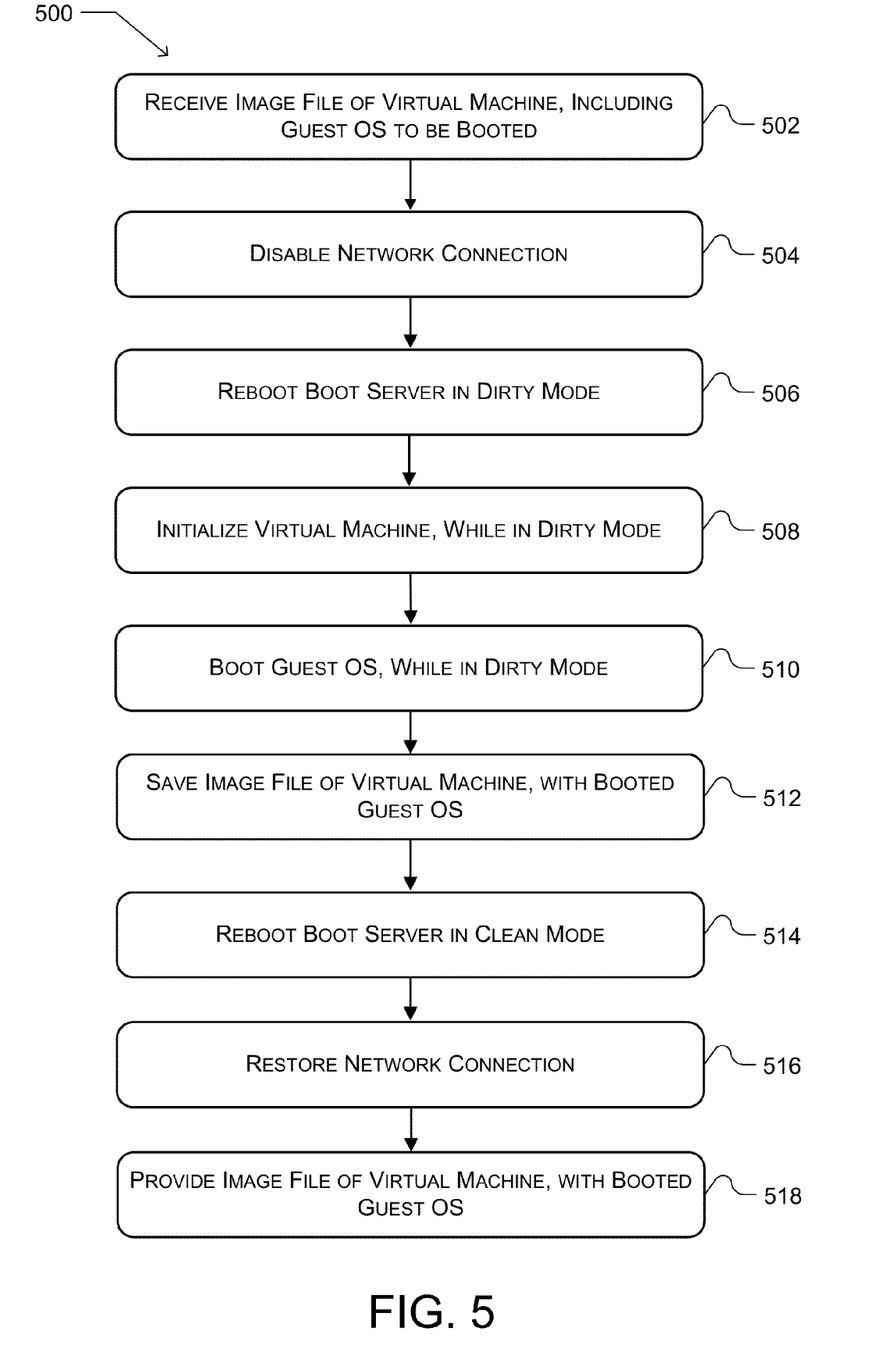
FIG. 5 is a flow diagram of an illustrative process for securely booting a guest operating system, according to embodiments.

FIG. 5 depicts a flowchart showing an example process in accordance with various embodiments. The operations of this process are illustrated in individual blocks and summarized with reference to those blocks. The processes are illustrated as logical flow graphs, each operation of which may represent a set of operations that can be implemented in hardware, software, or a combination thereof.

In the context of software, the operations represent computer-executable instructions stored on one or more computer storage media that, when executed by one or more processors, instruct or otherwise enable the one or more processors to perform the recited operations. Generally, computer-executable instructions include routines, programs, objects, modules, components, data structures, and the like that perform particular functions or implement particular data types. The order in which the operations are described is not intended to be construed as a limitation, and any number of the described operations can be combined in any order and/or in parallel to implement the process described.

The boot server offers two modes of operation: 1) a clean mode used when importing and exporting guest VM images in and out of the boot server; and 2) a dirty mode used for initializing the guest VM and booting a guest OS. To ensure that any malicious third-party software included with the guest OS is prevented from infecting any other devices, the boot server is connected to the network (e.g., via a network switch) only when it is running in clean mode, using a known-good configuration with no executing guest VM present.

FIG. 5 depicts an example process 500 for securely booting a guest OS running within a guest VM. In some embodiments, process 500 may execute on boot server device 208, which operates with a more complete virtualization stack (e.g., a stack that includes those virtual devices needed to boot a guest OS, as described above). After initializing, process 500 receives at block 502 an image file of a guest virtual machine, the image file including the guest OS to be booted. Such an image file may be received over network(s) 202 from one of production server device(s) 206. The guest VM may operate on a production server to host third-party software (e.g., a guest OS and/or application(s)) installed by a user.

At a time when the guest OS is about to boot on a production server, that production server's hypervisor may receive an indication that the guest OS is about to boot. In some embodiments, the hypervisor detects that a guest OS is ready to be booted by monitoring a particular port. For example, in x86 architecture, the keyboard controller port 0x64 links to the CPU reset pin. By interposing on this port, the hypervisor can detect that the guest OS has finished shutting down and is about to reboot. At this time, the hypervisor may save a snapshot of the guest VM (and hosted guest OS) to an image file, request boot service from the boot server, and send the image file to the boot server. Various imaging mechanisms may be employed to create the image file.

At block 504, after receiving the image of the guest VM, the network connection between the boot server and the rest of the network is disabled. Isolation of the boot server from the rest of the environment is accomplished through the use of a dedicated network switch (e.g., switch 210). This switch is configured to offer connectivity to the boot server only when the boot server is running in a clean mode. In some embodiments, a remote software attestation protocol is used to determine which mode the boot server is in. If the boot server's attestation corresponds to the clean mode, then the switch turns on network connectivity. An example attestation protocol is described in more detail with regard to FIG. 6. However, it should be noted that embodiments are not limited to the example attestation protocol, and any protocol may be used by the boot server to attest to its software configuration. When the boot server is ready to reboot into the dirty mode, it first indicates to the switch that network connectivity should be turned off. After the boot server's network connection is disabled at block 504, the boot server is rebooted in dirty mode at block 506.

At block 508, the virtual machine is initialized, and the guest OS is booted at block 510. The guest OS may be a commodity OS (e.g., Windows®, Linux®, or other OS), but it should be understood that any customized or non-commodity guest OS may also be supported by embodiments. The more complete virtualization stack executing on the boot server may allow the guest OS to boot successfully, as discussed herein.

After the guest OS finishes booting on the boot server, the boot server may take an image (e.g., snapshot) of the guest VM with the booted guest OS, and save the image file in block 512. This image captures the guest VM's current execution state, including that of the virtual devices, to the image file.

The boot server is then rebooted into clean mode at block 514. In some embodiments, this includes restoring the boot server to a known-good state (e.g., overwriting the boot server with a clean image, known to be free of potentially malicious software). After rebooting into the clean mode, the boot server's network connection is re-enabled at block 516, following the boot server's attestation that it is running in the clean mode (described further below). At block 518, the saved image file is provided to the production server that requested that the guest OS be booted. The guest VM and guest OS may then resume operations on the production server, using the reduced virtualization stack described above.

Illustrative Attestation Protocol

Embodiments support an attestation protocol that: 1) identifies certain information (e.g., a secret) that the boot server may provide to the switch as proof that the boot server is operating in clean mode (so that the switch may reestablish connectivity between the boot server and other devices); and 2) binds the secret so that the secret is accessible only when the boot server is operating in clean mode, to ensure that malicious software may not gain access to the secret. In this way, the attestation protocol attests that the boot server is operating in clean mode, so that the switch may allow communication between the boot server and other devices.

An example attestation protocol uses the 48-bit MAC address of the boot server NIC as the secret, to control the boot server's network connectivity. The switch may be configured with a whitelist of MAC addresses to be allowed network access, such that the switch enables network connectivity when the boot server's NIC presents one of the whitelisted MAC addresses. When presented with a MAC address not on the whitelist, the switch denies connectivity.

In some embodiments, the attestation protocol employs a secure co-processor to ensure that a secret (e.g., the whitelisted MAC address) is revealed only to an appropriate software configuration (e.g., the clean configuration of the boot server). This process of sealing the secret to the appropriate software configuration may be performed by a secure co-processor such as employed by the Trusted Platform Module™ (TPM) of the Trusted Computing Group™ (TCG). Through use of a secure co-processor, the software attestation protocol ensures that the boot server can unseal and retrieve the MAC from the secure co-processor only when booted in clean mode. If the boot server is booted in the dirty mode, the protocol ensures that the server cannot retrieve the MAC from the secure co-processor.

Moreover, some embodiments may employ a secret that includes both the MAC address of the boot server NIC and the MAC address of the switch. This generates a 96-bit secret that may be more difficult for malicious software to hack, providing greater security than use of the 48-bit boot server NIC MAC address.

In some embodiments, a secure co-processor running on the boot server protects the boot server's whitelisted MAC address, to ensure that it is only accessible when the boot server is in clean mode. The whitelisted MAC address is encrypted and saved while the boot server is operating in clean mode. The MAC address may be decrypted and retrieved if the following two conditions are true: 1) decryption is performed on the same machine (e.g., the boot server) where encryption was performed; and 2) the boot server's boot configuration matches the configuration that was active (e.g., the clean mode) when the whitelisted MAC address was encrypted and saved. To ensure that these two conditions are met, the encryption key used to encrypt the MAC address is sealed and recorded in one or more registers by the secure co-processor. In some embodiments, the register value(s) consist of hashes of the boot server BIOS, firmware, Master Boot Record (MBR), the Windows Boot Manager (BootMgr), and the boot configuration data.

The encryption key may only be unsealed by the boot server's boot manager before the boot server is booted, because the boot manager caps the relevant register(s) by extending them with a fixed value. This capping prevents the register(s) from being accessible to any other OS running on the boot server. The boot manager may unseal the encryption key if it has the appropriate register values. The key remains safe because the boot manager unseals the key only for the partition that it intends to boot from. Further, an attacker is prevented from modifying the boot manager because in that event the register values would not match and the unseal operation would fail. In some embodiments, the register(s) can be extended but cannot be reset without a reboot of the boot server. This ensures that an already booted OS, even if it has access to all of the state information to calculate the correct hash values, cannot insert those values into the register(s).

Figure 6:
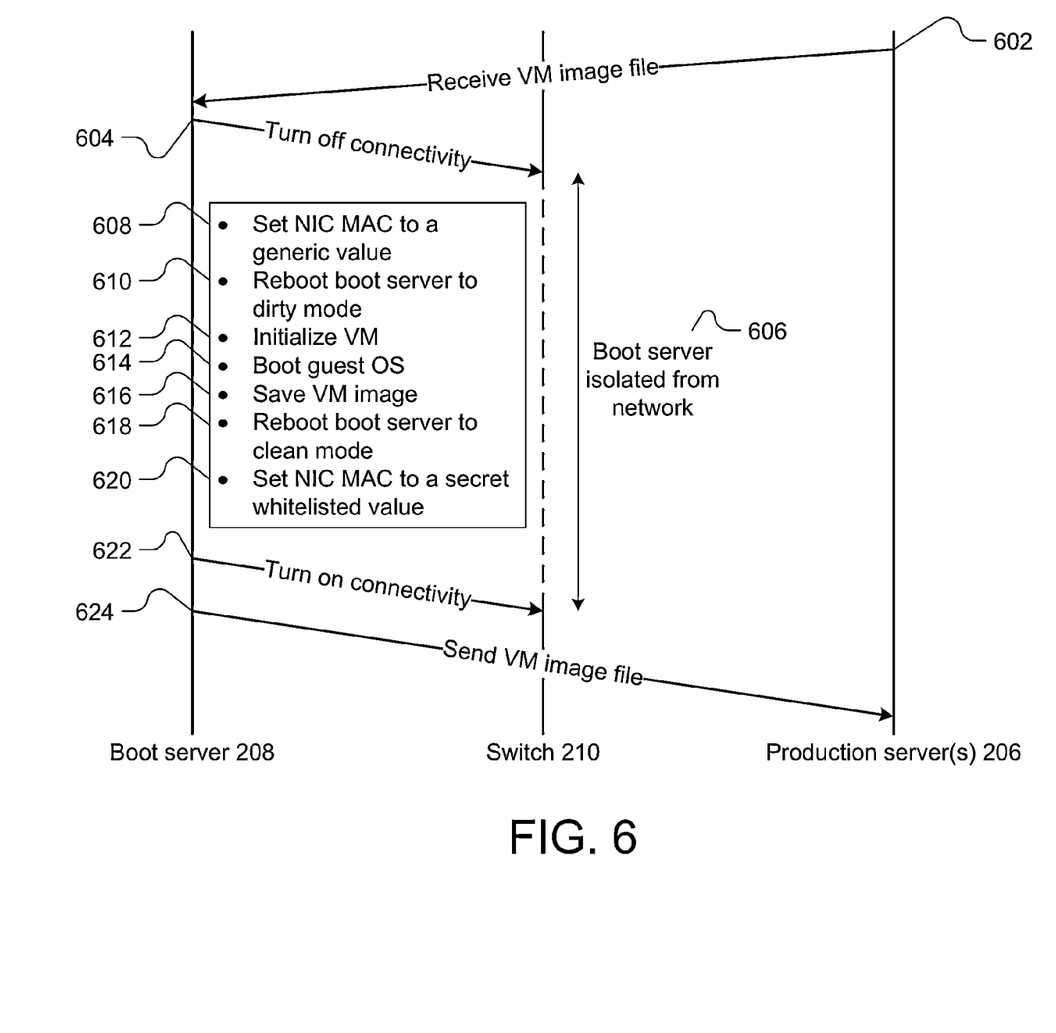
FIG. 6 is a diagram of an illustrative process and communications for securely booting a guest operating system, according to embodiments.

FIG. 6 depicts an illustrative process and communications for securely booting a guest operating system, employing an attestation protocol. The particular attestation protocol is an example of one attestation protocol that may be used with embodiments, and other attestation protocols may be employed. FIG. 6 shows various communications between production server device(s) 206, boot server device 208, and switch 210, and functionality of the example attestation protocol. The order in which the operations are listed in FIG. 6 and described herein is not intended to be construed as a limitation, and any number of the described operations can be combined in any order and/or in parallel to implement the process described.

As shown, at step 602 the boot server receives from a production server an image file of a guest VM and guest OS to be booted. After receiving the image file, boot server sends a communication to the switch at step 604 to turn off connectivity and thus isolate the boot server from the rest of the environment. During a period of time 606, connectivity between the boot server and the outside world is disabled, enabling the secure booting of the guest OS in an isolated environment. As described above, the boot server's isolation from the rest of the network is ensured through use of a secure co-processor to seal a secret (e.g., a MAC address of a NIC of the boot server) to the clean mode configuration of the boot server, so that the secret is only accessible when the boot server is operating in the clean mode.

After the boot server requests that the switch disable connectivity, the boot server's actual NIC MAC address is sealed by the secure co-processor, and the boot server's NIC MAC address is set to a generic (i.e., non-whitelisted) value at step 608. This ensures that any malicious software running on the boot server is prevented from reestablishing connectivity. At step 610, the boot server is rebooted to dirty mode. The guest VM is initialized at step 612, the guest OS is booted at step 614, and a snapshot image of the state of the guest VM and booted guest OS is saved at step 616, as discussed above with regard to FIG. 5.

Then, at step 618, the boot server is rebooted into clean mode. At step 620, the boot server NIC's MAC address is reset to its secret, whitelisted value, after that value is unsealed by the secure co-processor, retrieved and decoded according to the attestation protocol described above. At step 622, connectivity is reestablished, and the saved VM image is transferred to the production server at step 624.

Additional Security Considerations

If the boot server becomes compromised with malicious software, there are three possible consequences: 1) the malicious software may attempt to attack other devices in the environment (e.g., in the data center or cloud infrastructure generally); 2) the malicious software may compromise the clean mode execution environment on the boot server; and 3) the malicious software may attempt to launch a DoS attack by refusing to restart the boot server in the clean mode. Embodiments address each of these possible types of attacks. To prevent the first class of attacks, embodiments ensure that network connectively to the production server(s) is disabled when the boot server is not running in clean mode, as described above.

To prevent the second class of attack, the trusted clean execution environment for the boot server (i.e., the state of the boot server when running in clean mode) is stored in a sealed and/or encrypted partition of the boot server. This prevents malicious software from modifying the trusted clean execution environment. Further, although malicious software could conceivably deleted the encrypted partition and put a new, corrupted version in its place, such an act would also delete the whitelisted MAC address of the boot server NIC, and prevent the boot server from using the attestation protocol described above to attest to the switch and gain connectivity. As an additional security consideration, when the boot server runs in clean mode, the received guest VM image is stored as an image file and not activated until the boot server is in dirty mode.

In the third class of attack, malicious software may compromise the boot server and prevent it from rebooting back into a clean mode, effectively preventing the boot server from reestablishing network connectively. This form of DoS attack (e.g., denying services from the boot server) may be accomplished by the malicious software deleting the encrypted partition with its trusted clean execution environment, as described with regard to the second class of attack. Embodiments address this type of attack by including time-out functionality on the production server. For example, a production server may request that a guest OS be booted on a boot server, and sends the guest VM image to the boot server. If a certain predetermined threshold period of time elapses, and the production server does not receive a guest VM image back from the boot server, the production server may send an alert message to an administration server and/or a human operator indicating that there may be a problem with the boot server. At that point, the boot server may be manually reformatted as a security measure while it is still disconnected from the network. After reformatting, the production server may be instructed to request boot services from the boot server again. Alternatively, the production server may be instructed to request boot services from a different boot server.

Conclusion

Embodiments described herein provide for the secure booting of a guest OS on a dedicated, isolated boot server, and also provide for an attestation protocol that ensures the boot server is operating in a clean mode when connected to the outside world. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method comprising:
    at a boot server device, receiving from an external device a first image file of a virtual machine (VM), including a guest operating system (OS) to be booted;
    disabling a connection between the boot server device and the external device, including providing a first address for a network interface of the boot server device, wherein the first address is blocked at a switch;
    booting the guest OS on the boot server device;
    saving a second image file of the VM, including the booted guest OS;
    restoring the connection between the boot server device and the external device, including employing an attestation protocol to attest to a particular software configuration of the boot server device by providing a second address for the network interface of the boot server device, wherein the second address is allowed at the switch; and
    providing the second image file to the external device, to enable the booted guest OS to operate on the external device.

2. The method of claim 1, wherein the boot server device operates with a first virtualization stack, and wherein the external device operates with a second virtualization stack that is reduced in comparison with the first virtualization stack.

3. The method of claim 1, wherein the second address is a media access control (MAC) address of the network interface.

4. The method of claim 1, wherein the second address includes first data associated with the network interface and second data associated with the switch.

5. The method of claim 4, wherein the first data is a first MAC address of the network interface, and wherein the second data is a second MAC address of the switch.

6. The method of claim 1, wherein the attestation protocol uses a secure co-processor to seal the second address, to ensure that the second address is inaccessible to the VM while the boot server device is operating in a dirty mode, wherein the VM is initialized and the guest OS boots while the boot server device is operating in the dirty mode.

7. The method of claim 1, wherein the particular software configuration is a clean mode of the boot server device, and further comprising booting the boot server device in the clean mode before restoring the connection between the boot server device and the external device and after saving the second image file of the VM.

8. The method of claim 7, wherein the attestation protocol uses a secure co-processor to unseal the second address, to ensure that the second address is accessible while the boot server device is operating in the clean mode.

9. A system comprising:
   a production server device, operating with a reduced virtualization stack, wherein the reduced virtualization stack supports at least one virtual device that provides reduced functionality; and
   a boot server device, operating with a more complete virtualization stack than the reduced virtualization stack of the production server device, wherein the boot server device is configured to:
      receive from the production server device a first image that includes a guest operating system (OS);
      ensure that the boot server device is disconnected from a network while the guest OS boots on the boot server device, using an attestation protocol that attests to a particular configuration of the boot server device and that employs a secure co-processor to seal an address associated with the boot server device; and
      provide to the production server device a second image that includes the booted guest OS, to enable the booted guest OS to execute on the production server device using the reduced virtualization stack.

10. The system of claim 9, wherein the first image further includes a virtual machine (VM), and wherein the boot server device is further configured to initialize the VM prior to booting the guest OS.

11. The system of claim 9, wherein the address associated with the boot server device is a media access control (MAC) address of a network interface of the boot server device.

12. The system of claim 9, wherein the at least one virtual device that provides reduced functionality includes at least one of a storage device, a network interface device, a bus controller device, or an interrupt controller device.

13. The system of claim 9, wherein the more complete virtualization stack supports at least one legacy virtual device that is required for the guest OS to boot, and that is not supported by the reduced virtualization stack.

14. The system of claim 9, wherein the boot server device is further configured to:

send to a network switch a request that the boot server device be disconnected from the network; and
provide a generic address for a network interface of the boot server device, wherein the generic address is disallowed at the network switch.

15. The system of claim 9, wherein the boot server device is further configured to:
   employ the secure co-processor to unseal the address;
   send to a network switch a request that the boot server device be connected to the network, the request including a presentation of the address.

16. One or more computer-readable storage media devices, storing information to instruct a processor to perform actions comprising:
   at a boot server device, receiving from an external device a first image file that includes a guest operating system (OS) to be booted;
   booting the guest OS on the boot server device, while the boot server device is disconnected from a network;
   saving a second image file that includes the booted guest OS;
   requesting that the boot server device be connected to the network, including setting an address of a network interface of the boot server device to a value that is recognized by a switch that controls access to the network and attesting to a clean software configuration of the boot server device; and
   sending the second image file to the external device, to enable the booted guest OS to operate on the external device.

17. The one or more computer-readable storage media devices of claim 16, wherein the actions further comprise requesting that the boot server device be disconnected from the network, including setting the address of the network interface to a generic value that is not recognized by the switch, prior to booting the guest OS.

18. The one or more computer-readable storage media devices of claim 16, wherein the address of the network interface is a media access control (MAC) address of the network interface.

19. The one or more computer-readable storage media devices of claim 16, wherein the boot server device operates a first virtualization stack, and wherein the external device operates a second virtualization stack that supports fewer virtual devices than the first virtualization stack.

20. The one or more computer-readable storage media devices of claim 19, wherein the second virtualization stack supports at least one virtual device with reduced functionality compared to a corresponding virtual device supported by the first virtualization stack.

* * * * *